(12) United States Patent
Pandel (10) Patent No.: US 8,520,959 B2
(45) Date of Patent: Aug. 27, 2013

(54) METHOD AND DEVICE FOR DETERMINING IMAGE QUALITY

(75) Inventor: Jürgen Pandel, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 534 days.

(21) Appl. No.: 12/747,920

(22) PCT Filed: Oct. 23, 2008

(86) PCT No.: PCT/EP2008/064351
§ 371 (c)(1),
(2), (4) Date: Jun. 13, 2010

(87) PCT Pub. No.: WO2009/074393
PCT Pub. Date: Jun. 18, 2009

(65) Prior Publication Data
US 2010/0278432 A1    Nov. 4, 2010

(30) Foreign Application Priority Data
Dec. 13, 2007  (DE) .................... 10 2007 060 004

(51) Int. Cl.
*G06K 9/36*  (2006.01)
*G06K 9/40*  (2006.01)

(52) U.S. Cl.
USPC .......................................... 382/236; 382/254

(58) Field of Classification Search
None
See application file for complete search history.

(56) References Cited

U.S. PATENT DOCUMENTS

| 7,477,792 | B2* | 1/2009 | Wu et al. ...................... 382/240 |
| 2004/0114685 | A1 | 6/2004 | Kouloheris et al. ...... 375/240.03 |
| 2008/0025397 | A1* | 1/2008 | Zhao et al. ............... 375/240.13 |
| 2009/0046092 | A1 | 2/2009 | Sato et al. .................... 345/418 |

FOREIGN PATENT DOCUMENTS

| JP | 2007214785 | 8/2007 |
| WO | 2004049243 | 6/2004 |
| WO | 2007071076 | 6/2007 |

OTHER PUBLICATIONS

Orlowski, "Understanding QMM Objective Picture Quality Measurements," Pixelmetrix Application Note AN112, http://www.broadcastpapers.com/whitepapers/understanding-QMM-objective-picture-quality-measurements.frm?objd=32&pid=632&fromcategory=52 (4 pages), 2003.

Leontaris et al. "Flicker Suppression in JPEG2000 Using Segmentation-Based Adjustment of Block Truncation Lengths," IEEE International Conference on Acoustics, Speech and Signal Processing,—2007. ICASSP 2007, Honolulu HI, vol. 2, pp. 1-1117-1-1120, Apr. 15-20, 2007 (4 Pages), Apr. 15, 2007.

(Continued)

*Primary Examiner* — Bhavesh Mehta
*Assistant Examiner* — David F Dunphy
(74) *Attorney, Agent, or Firm* — King & Spalding L.L.P.

(57) ABSTRACT

In a method and a device for determining an image quality of an image sequence comprising several images, the images are reconstructed from a data stream encoded by a predictive encoding process, and a respective flicker indicator is determined for an image range of the respective images of the image sequence, wherein the respective flicker indicator displays by two states whether flickering occurs or not in the image range of the respective image, an overall flicker indicator being generated such that the overall flicker indicator corresponds to that number of flicker indicators which display flickering, and the image quality being generated by division of the overall flicker indicator by a number of specific flicker indicators.

13 Claims, 4 Drawing Sheets

(56) References Cited

OTHER PUBLICATIONS

Marziliano et al. "A No-Reference Perceptual Blur Metric," Proc. of Int. Conf. on Image Processing ICIP 2002, vol. 3, pp. 57-80, Rochester NY Sep. 22-25, 2002 (4 pages), Sep. 22, 2002.

Wong et al. "Correcting Flicker in Color Motion Pictures," Digital Image Computing: Techniques and Applications, 2005. DICTA 05 Proceedings Dec. 2005, Piscataway, NJ, USA, IEEE 20 S 273-277 XP010879336 ISBN: 978-0-7695-2774-1 (6 Pages), Dec. 1, 2005.

* cited by examiner

METHOD AND DEVICE FOR DETERMINING IMAGE QUALITY

CROSS-REFERENCE TO RELATED APPLICATIONS

This application is a U.S. National Stage Application of International Application No. PCT/EP2008/064351 filed Oct. 23, 2008, which designates the United States of America, and claims priority to German Application No. 10 2007 060 004.8 filed Dec. 13, 2007, the contents of which are hereby incorporated by reference in their entirety.

TECHNICAL FIELD

The invention relates to a method and a device for determining an image quality of an image sequence comprising a plurality of images, with the images being reconstructed from a data stream encoded by means of a predictive-encoding process.

BACKGROUND

Recent years have seen an increase in applications that employ compressed images such as person monitoring in city centers, for instance, and video telephony. It is therein known that a significantly impaired image quality has to be accepted when image and video data is highly compressed. A widely applied known criterion for assessing the quality of image and video data is a PSNR (PSNR: Peak Signal-to-Noise Ratio) method. That entails summating differences in corresponding pixels of an image prior to encoding and of an image reconstructed based on the encoding and decoding, then representing the summated value as a logarithmic value. That, though, requires the pixels of the image data to be available prior to encoding.

A known method for rating the quality of reconstructed image data employs known compression artifacts. Instances thereof occurring in the case of, for instance, JPEG (JPEG: Joint Picture Expert Group) and MPEG-2 (MPEG: Motion Picture Expert Group) are disruptive block artifacts that can be quantified easily and relatively reliably by analyzing brightness steps at block boundaries. A mean change in brightness at the block boundaries then serves as a measure of the diminution in quality of compressed images; see [1], for example. That method fails, however, in the case of compression techniques where the brightness steps at the block boundaries or, as the case may be, block edges are smoothed. That is the case with, for example, an ITU-H.264 (ITU: International Telecommunication Union) video-compression standard because H.264 employs an adaptive "deblocking filter" for eliminating brightness steps at block boundaries.

A further known possibility for determining quality in reconstructed image and video data is to ascertain image blurring with the aid of edge analyses, as mentioned by way of example in document [2]. Blurring of such kind arises on the one hand from a lack of higher-frequency transform coefficients due to coarse quantizing. Image blurring is on the other hand further intensified by the deblocking filter in the case of the H.264 standard. However, the edge analyses often result in misclassification in the case of video and image signals such as those, for example, coded using the H.264 standard. High-contrast edges are observed to be retained even when compression is very high. The reasons are that the corresponding transform coefficients are not eliminated owing to the respectively high amplitude and that the deblocking filter is deactivated when the contrast is high.

SUMMARY

According to various embodiments, a device and a method can be provided enabling an image quality of an image sequence comprising a plurality of images reconstructed from a coded data stream to be determined in such as way that determining of the image quality can be performed only on an analysis of said images and the image quality can be determined in a simple manner.

According to an embodiment, a method for determining an image quality of an image sequence comprising a plurality of images wherein images are used that are reconstructed from a data stream encoded by means of a predictive-encoding process, may comprise the steps of: Determining a respective flicker indicator for an image range of the respective images in the image sequence, with the respective flicker indicator indicating by means of a first and second state whether flickering does or does not occur in the image range of the respective image; Generating an overall flicker indicator in such a way that the overall flicker indicator corresponds to the number of flicker indicators that indicate flicker; and Determining the image quality by dividing the overall flicker indicator by a number of determined flicker indicators.

According to a further embodiment, a first image range can be determined in the first image and a second image range in the second image, with the first and second image range occupying the same location within the respective image and the first image occurring temporally before the second image, and the flicker indicator of the second image range can be determined by the following steps: Ascertaining whether the second image range in the encoded data stream has undergone coding or no coding, with an image content of the second image range being generated by copying an image content of the first image range in the case of the "no coding" variant; and Ascertaining whether the first image range in the encoded data stream has undergone coding or no coding; Assigning the first state that indicates flicker in the second image range to the flicker indicator of the second image range if the first and second image range have different coding. According to a further embodiment, a difference value may be produced between the first and second image range, particularly on the basis of luminance values of the pixels of the respective image ranges, and the first state is assigned to the flicker indicator of the second image range if the difference value exceeds a specifiable threshold. According to a further embodiment, the specifiable threshold may be selected as a function of an image property of the second image range. According to a further embodiment, the threshold will be raised if the image property of the second image range indicates a dark and/or highly structured image content. According to a further embodiment, the first state will be assigned to the flicker indicator of the second image range only if the first and second image range have a specifiable temporal coding sequence either of the first image range and no coding of the second image range no coding of the first image range and coding of the second image range. According to a further embodiment, an analysis can be performed for the image range to determine whether an image content in the image range has been changed at least partially by a new image object, and a first state will not be assigned to the flicker indicator of the image range if the change to the image range due to a new image object is detected during the analysis. According to a further embodiment, a respective flicker indicator can be ascertained for a number of image ranges of the respective image; the overall flicker indicator can be generated in such a way that the overall flicker indicator corresponds to the number of flicker indicators that indicate flicker; and the image quality can be determined by dividing the overall flicker indicator by a number of determined flicker indicators.

According to another embodiment, a device for determining an image quality of an image sequence comprising a plurality of images, wherein the images are reconstructed from a data stream encoded by means of a predictive-encoding process, characterized in that the device may have the following means: A first means for determining a respective flicker indicator for an image range of the respective images of the image sequence, with the respective flicker indicator indicating by means of a first and second state whether flickering does or does not occur in the image range of the respective image; A second means for generating an overall flicker indicator in such a way that the overall flicker indicator corresponds to the number of flicker indicators that indicate flicker; and A third means for determining the image quality by dividing the overall flicker indicator by a number of determined flicker indicators.

According to a further embodiment of the device, the device may have a fourth means embodied such that the fourth means may perform the method steps as described above.

BRIEF DESCRIPTION OF THE DRAWINGS

The invention and its developments will be explained in more detail with the aid of drawings, of which.

Elements having the same function and action are identified by the same reference numerals/letters.

DETAILED DESCRIPTION

In a method for determining an image quality of an image sequence comprising a plurality of images, the images being reconstructed from a data stream encoded by means of a predictive-encoding process, with which method the following steps are performed:

Determining a respective flicker indicator for an image range of the respective images in the image sequence, with the respective flicker indicator indicating by means of a first and second state whether flickering does or does not occur in the image range of the respective image;

Generating an overall flicker indicator in such a way that the overall flicker indicator corresponds to the number of flicker indicators that indicate flicker;

Determining the image quality by dividing the overall flicker indicator by a number of determined flicker indicators.

The method has the advantage that the image quality is ascertained only on the basis of the images reconstructed from the encoded data stream. It is hence unnecessary to keep non-coded images as a reference prior to encoding, resulting in a saving in memory space. It is furthermore also possible with said method to determine the image quality on terminals which, owing to their physical characteristics, have no access to the reference as in the case of, for instance, wireless terminals having a low-rate air interface, for example in the case of telephones operating according to the GSM (GSM: Global System Mobile) standard.

The term "flicker" is known from, for example, a document [3]. The way document [3] defines flicker is that temporal artifacts occur at locations within the image owing to variations in reconstructed image ranges displaying little movement across successive images in a compressed image sequence.

The image quality Q generally assumes a value between 0 and 1, with its being the case that the smaller a value of the image quality is, the higher the image quality will be.

Preferably a first image range is determined in the first image and a second image range in the second image, with the first image range and second image range occupying the same location within the respective image and the first image occurring temporally before the second image, and the flicker indicator of the second image range is determined by the following steps:

Ascertaining whether the second image range in the encoded data stream has undergone predictive coding or no coding, with an image content of the second image range being generated by copying an image content of the first image range in the case of the "no coding" variant;

Ascertaining whether the first image range in the encoded data stream has undergone predictive coding or no coding;

Assigning the first state that indicates flicker in the second image range to the flicker indicator of the second image range if the first and second image range have different coding.

A simple method for determining the flicker and thereby the image quality is disclosed by means of said expansion. Said expansion is furthermore characterized in that it can be implemented with a low level of computing complexity.

If, moreover, a difference value is produced between the first and second image range, particularly on the basis of luminance values of the pixels of the respective image ranges, and the first state assigned to the flicker indicator of the second image range if the difference value exceeds a specifiable threshold, then misclassifications in determining the flicker will be reduced and the meaningfulness of the image quality significantly increased thereby. The difference value is a measure of a difference in the image contents of the two image ranges.

The specifiable threshold is preferably selected as a function of an image property of the second image range so that a further reduction in misclassification can be achieved. In particular the threshold will be raised if the image property of the second image range indicates a dark and/or highly structured image content. An image content is to be regarded, for example, as dark if the associated luminance pixels are close to the brightness value black. If the luminance pixels have, for example, a value range from 0 to 255 and the value 0 is defined as black, the value 255 as white, and the intermediate values as gray tones increasing from black to white, then a value less than 50 can be regarded as dark. Highly structured image contents are characterized in that high image frequencies occur in the image content under consideration. Thus, for instance, there will be a highly structured image content in the case of an 8×8 image block having a transformed image block of 8×8 with two-dimensional image frequencies (one d.c. component and 63 frequency components) if, for example, at least one of the 20 highest-frequency image frequencies is not zero even after quantizing of the predictive-encoding process.

In a further alternative embodiment the first state will be assigned to the flicker indicator of the second image range only if the first and second image range have a specifiable temporal coding sequence either (a) coding of the first image range and no coding of the second image range or (b) no coding of the first image range and coding of the second image range. That will make it possible to reduce both the processing complexity for executing the method and the memory requirements for implementing it.

In an embodiment of the method an analysis is performed for the image range, which is to say for the second image range, to determine whether the image range has been changed at least partially by a new image object, and a first state will not be assigned to the flicker indicator of the image range if the change to the image range due to a new image object is detected in the analysis step. The quality in determining the image quality will be enhanced thereby because detecting of flicker when the new image object appears will be explicitly excluded.

The method can be expanded to the effect that the following steps will be performed:

Ascertaining a respective flicker indicator for a number of image ranges of the respective image;

Generating the overall flicker indicator in such a way that the overall flicker indicator corresponds to the number of flicker indicators that indicate flicker;

Determining the image quality by dividing the overall flicker indicator by a number of determined flicker indicators.

Said expansion is advantageous in practice because a more exact statement about image quality will be made possible through the use of a plurality of image ranges of the images since, for example, flicker is conspicuous only from observing over an extensive area.

In a device for determining an image quality of an image sequence comprising a plurality of images, the images being reconstructed from a data stream encoded by means of a predictive-encoding process, which device has the following means:

A first means for determining a respective flicker indicator for an image range of the respective images in the image sequence, with the respective flicker indicator indicating by means of a first and second state whether flickering does or does not occur in the image range of the respective image;

A second means for generating an overall flicker indicator in such a way that the overall flicker indicator corresponds to the number of flicker indicators that indicate flicker;

A third means for determining the image quality by dividing the overall flicker indicator by a number of determined flicker indicators.

The method can be implemented and executed with the aid of the device.

The device can further have a fourth means embodied such that the fourth means performs method steps in accordance with one or more of the extensions of the method.

Figure 1:
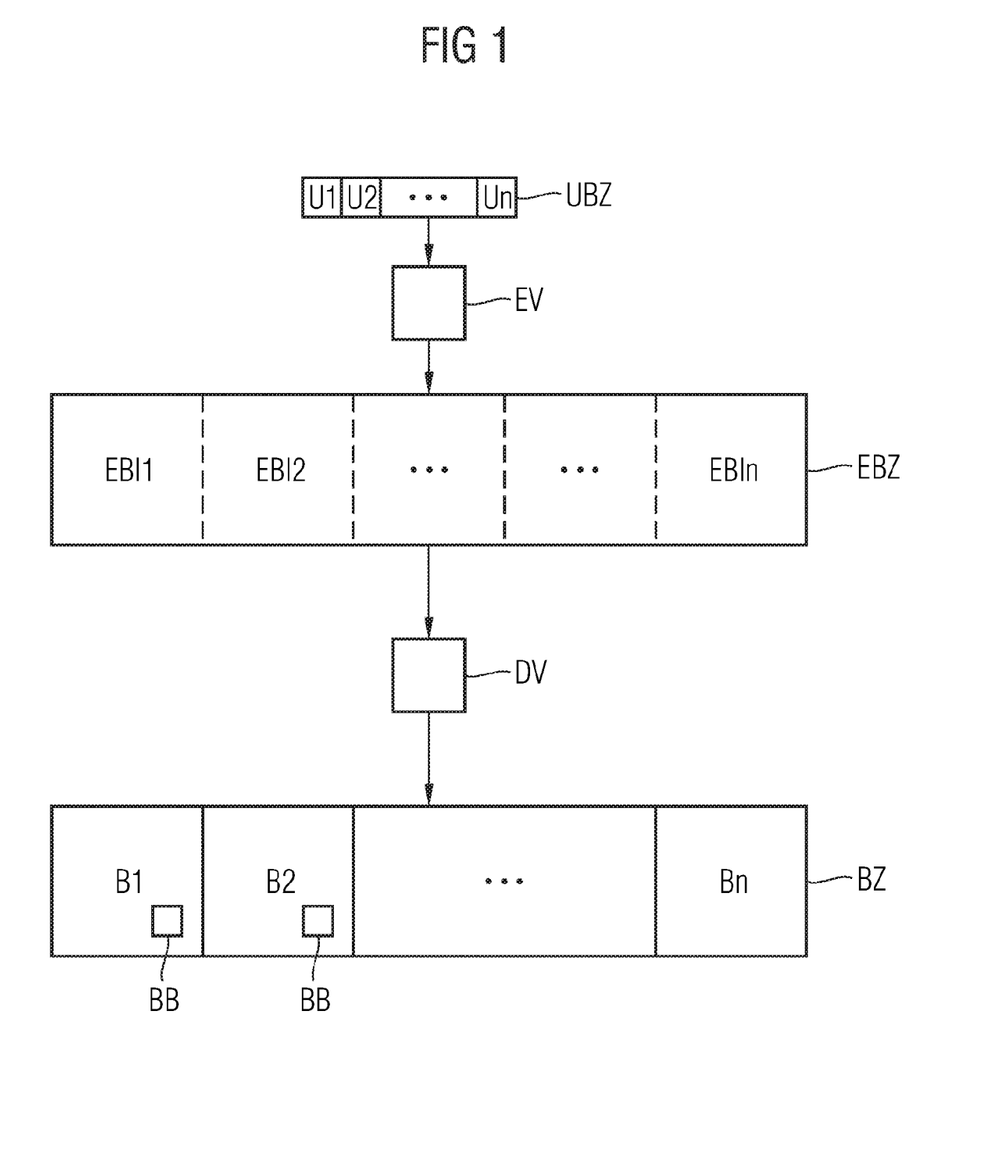
FIG. 1 illustrates the production of an encoded data stream and shows reconstructed images (prior art)

FIG. 1 gives details of the steps involved in encoding and decoding image data or, as the case may be, images in very general terms. A sequence UBZ of non-coded images U1, U2, . . . Un, recorded by a camera, for example, are encoded into an encoded data stream EBZ with the aid of a predictive-encoding process EV. The encoding process operates according to, for example, an ITU-T H.264 or H.263 (ITU: International Telecommunications Union) video-coding standard. The encoded data stream comprises encoded data information EBI1, EBI2, . . . , EBIn having in each case encoded image information for the respective non-coded images U1, U2, . . . Un. The encoded data stream is in an ensuing step assigned to a predictive-decoding process DV that corresponds to the predictive-encoding process EV and which produces an image sequence comprising a plurality of images B1, . . . Bn from the encoded data stream EBZ, with the images B1, . . . Bn constituting reconstructed images. Encoding by means of the predictive-encoding process generally results in a loss of image information.

An exemplary embodiment is explained in more detail below. Flickering, and hence an associated flicker indicator I2, is therein determined from observing an image range from two successive images. The image range is for example an image block of 4×4 pixels or a macroblock having 16×16 pixels. The term "flicker" is known from, for example, a document [3]. The way document [3] defines flicker is that temporal artifacts occur at locations within the image owing to variations in reconstructed image ranges displaying little movement across successive images in a compressed image sequence. The flicker indicator can hence have two states Z1, Z2 that are defined as follows:

First state Z1: The image range under consideration exhibits flickering;

Second state Z2: The image range under consideration exhibits no flickering.

When the non-coded images are coded, a respective image range is coded in keeping with one of the two following coding states:

COD: The image range under consideration has been coded, for example by means of an intra- or inter-coding mode;

NCOD: The image range under consideration has not been coded.

What is to be understood by the coding state NCOD="new coding" is that an image content of an image range is produced only by copying an image content of another image range. In standards such as ITU-T H.263, H.264, and ISO/IEC MPEG-2 the coding state NCOD of an image range/image block is referred to as "not coded". The other image range originates from, for example, an image temporally preceding the image in the image range. In that case an image content of an image range of an already reconstructed image will then be used for the image range under consideration.

Figure 2:
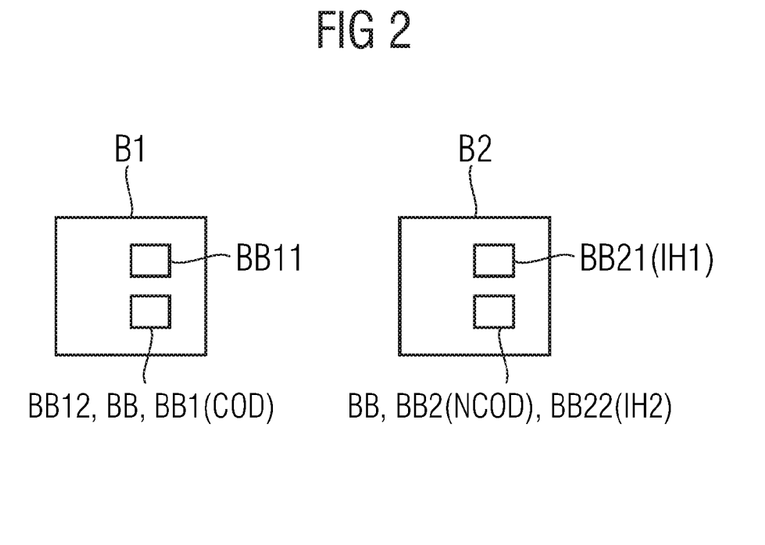
FIG. 2 shows two images with respective image ranges that are used for determining a flicker indicator.

FIG. 2 shows two images in the image sequence BZ having the first image B1 and second image B2. Each of the images has a plurality of image blocks BB, with one of the image blocks of the first image being referred to below as the first image range BB1 and one of the image blocks of the second image being referred to below as the second image range BB2. The first and second image ranges BB1, BB2 occupy an identical spatial position in the respective images, for example in each case bottom right in the respective image. The first image range BB1 has been coded and the second image range BB2 was non-coded. That is shown symbolically in FIG. 2 by means of the reference letters COD and NCOD. For determining the flicker indicator I2 of the second image B2, an analysis is carried out to establish whether the first and second image range have been coded differently. That is so in this case because the first image range has the coding state COD and the second image range has NCOD as its coding state. The flicker indicator I2 of the second image range BB2 is therefore set to the first state Z1 I2=Z1.

Figure 3:
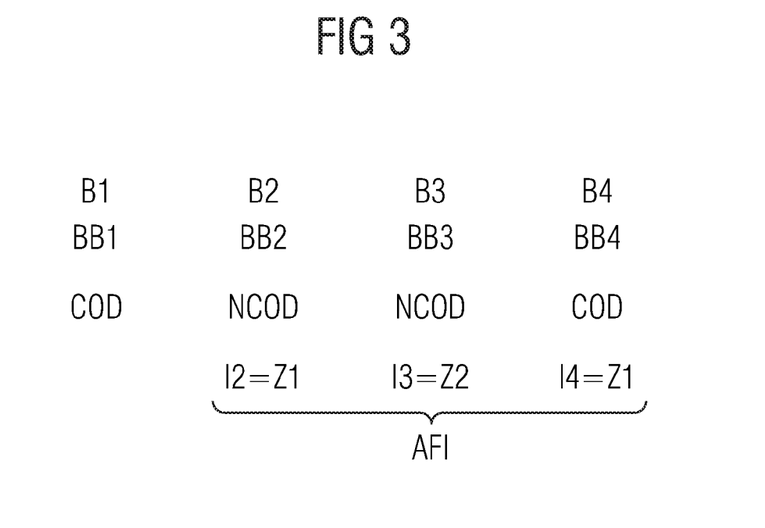
FIG. 3 shows coding states and states of flicker indicators for a plurality of image ranges in tabular form.

The coding states for a plurality of image ranges BB1, . . . , BB4 of four successive images B1, . . . , B4 have been plotted in FIG. 3. Also shown is the respective flicker indicator I2, I3, I4 resulting from a respective comparison of the coding states of two image blocks of two successive images. In this example the three flicker indicators I2, I3, I4 are ascertained.

In FIG. 3, the image ranges BB1 and BB4 have each been coded with the coding state COD for the image ranges BB2 and BB3 having the coding state NCOD in the coded data stream. Because the coding states of the image ranges BB1 and BB2 are different, the flicker indicator I2 of the second image range indicates flicker, which is to say I2=Z1. The image ranges Bb2 and Bb3 have an identical coding state so that no flickering is detected in the image range BB3 and hence the associated flicker indicator is I3=Z2. The image ranges BB3 and BB4 have been coded differently so that the flicker indicator I4 of the image range BB4 is I4=Z1.

In an ensuing step an overall flicker indicator GFI is generated which corresponds to a number of flicker indicators that indicate flicker, which is to say are in the state Z1. In the example shown in FIG. 3 those are two of the three flicker indicators so that the overall flicker indicator is GFI=2.

The image quality Q of the image sequence BZ is ascertained in a final step by dividing the overall flicker indicator GFI by a number AFI of determined flicker indicators. AFI=3 flicker indicators I2, I3, I4 have been ascertained according to the example shown in FIG. 3. Thus the image quality in this exemplary embodiment is Q=GFI/AFI=⅔. The image quality Q generally assumes a value between 0 and 1, with its being the case that the smaller a value of the image quality is, the higher the image quality will be.

With the aid of the present method it is hence possible to easily determine flickering in image ranges of the images in the image sequence and ascertain therefrom the image quality of the image sequence.

Because a single image range in the form of, for example, a macroblock represents for each image only a very small portion of an entire image and since disruptive flickering may only be perceived in larger image ranges, an obvious approach is to determine the image quality for each image over a larger image range or over a plurality of image ranges. Analogously to what was explained in connection with FIGS. 2 and 3, a respective flicker indicator IH1, IH2 is therein determined for a plurality of image ranges BB21, BB22 of the respective image. Image ranges BB11, BB22 of the temporally preceding image can therein also be taken into account for ascertaining the flicker indicators of the image.

A number AZBB of image ranges of the respective image in the image sequence are generally used for determining the respective flicker indicator. The overall flicker indicator is then computed analogously to the above process in such a way as to correspond to a number of flicker indicators that indicate flicker. The image quality Q is then determined by dividing the overall flicker indicator GFI by the number AFI of determined flicker indicators. If, for example, flicker indicators are generated for m images each having AZBB image ranges, then the image quality will be:

Q=GFI/AFI=GFI/(m*AZBB)

The number of images used for determining the image quality can be selected such that a specifiable period of time T is covered thereby. The number of images to be used will then be determined on the basis of the images coded within the specifiable period of time.

For example a rectangle having h×v pixels can be used in selecting the image ranges to be considered for each image. Equally, though, regions having any border, for example circles or ellipses, can be brought together by means of contiguous image ranges. For determining the image quality it can also be expedient for the image ranges employed to at least partially overlap. It can furthermore be expedient in practice for the respective image range to correspond precisely to one image block for which the predictive-encoding process employed produces precisely one of the coding states. A size of the image ranges can therein vary within an image, for example if the predictive-encoding process has precisely one of the coding states for different sizes of the image ranges, as for image ranges having the size 4×4 and 16×16.

In a development of the method the described method can also be used only for image ranges that have been predictively coded, which is to say by means of an inter-coding mode. If, for instance, an image range for which one of the flicker indicators is being determined is also intra-coded over the course of the images being considered, then the method can be expanded to the effect that only images that have been either predictively encoded or not encoded will be taken into consideration in determining the flicker indicator.

Figure 4:
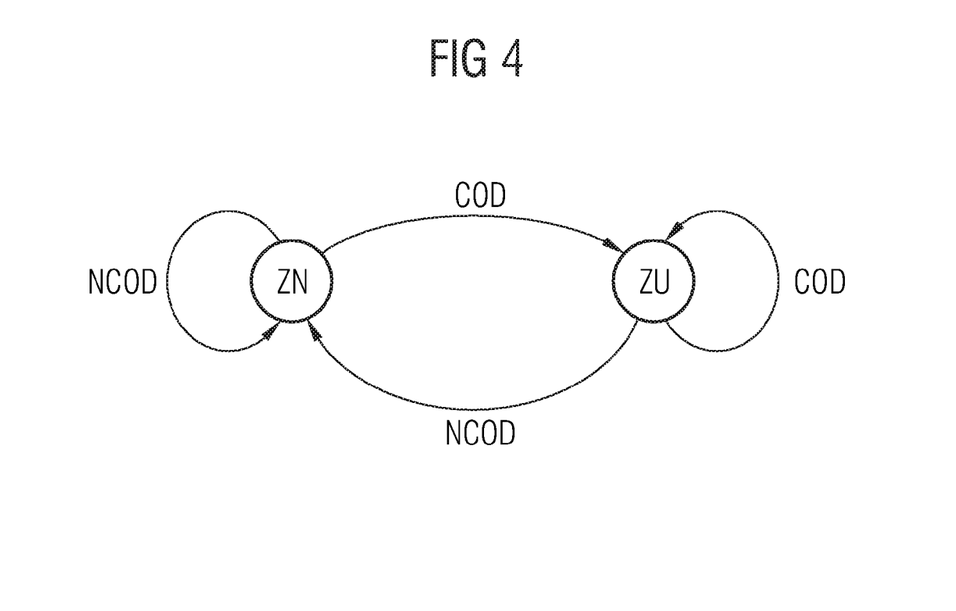
FIG. 4 shows a variant for determining the flicker indicators with the aid of a state diagram.

FIG. 4 shows an implementation variant of the method. A state diagram having the following states is herein considered:

ZN: No coding of the image range under consideration;
ZU: Coding of the image range under consideration.

The terms "coding" and "no coding" used here correspond to the definitions of the terms COD and NCOD.

A first image range BB1 from the first image B1 and a second image range BB2 from the second image B2 are selected for this example, with the two image blocks each occupying the same spatial position in the respective images. If the first image range BB1 has not been coded, then the state diagram will be in the state ZN. If the second image range BB2 is not coded, then the state diagram will go from the ZN to the ZN state, see NCOD. If, conversely, the second image range BB2 is coded, a COD state transition will take place from the ZN to the ZU state. If, though, the state diagram is in the state ZU, meaning that the first image range BB1 has been coded, then the ZU state will be attained again if the second image range BB2 has been coded, see COD loop. An NCOD state transition will otherwise take place, as a result of which the state diagram will go from the ZU to the ZN state. Generally flickering will be detected if a state transition takes place from one state to the other, which is to say from ZU→ZN or ZN→ZU.

Since when the non-coded images are recorded using a static camera and hence with a non-moving background, coding of an image range can likewise occur only occasionally owing to noise or changes in lighting in the images, in order to improve a statement about the image quality, the flicker in an image range can be detected only if a difference value between two image ranges of successive images produced, for example, on the basis of luminance values of the pixels of the image ranges exceeds a specifiable threshold SW. If, for example, the state diagram as shown in FIG. 4 is in the state ZN, then the state diagram will remain in that state in keeping with this expansion if the image range under consideration has the coding state COD but the difference value UW is below the specifiable threshold SW. What is avoided thereby is the detection of flickering even though it would not at all be perceived as flickering by an observer. The difference value UW can be produced by summating respective squared differences of in each case two corresponding pixels of both image ranges for all pixels in the image ranges.

With this development it is further possible to select the specifiable threshold SW as a function of an image property of the image range currently being considered, for example BB2. Thus the specifiable threshold SW will be raised if the image property of the image range being considered has a dark and/or highly structured image content. Thus the specifiable threshold and hence also the detection of flickering or, as the case may be, non-flickering can be taken into account as a function of the specific image content under consideration of the image range.

In a further alternative embodiment, flickering will not be detected unless the state diagram as shown in FIG. 4 has certain specifiable transition patterns. Thus detecting of flicker can be acknowledged only if the ZN state goes to the ZU state or the ZU state only goes to ZN. It is, though, alternatively possible for flickering to be detected only if the state diagram as a pattern passes through the state transitions ZN→ZU→ZN or ZU→ZN→ZU.

In a further embodiment, transitions of the state diagram from ZN to ZU will be taken into account only if there is an insignificant change in a brightness statistic of the image range being considered. If, for example, encoding of an image range takes place because a moving object enters the image range, that is not to be detected as flicker. Thus by taking into account that a brightness statistic undergoes a major change it can be indicated that a new object is entering the image range and that there is in that case no flicker. A histogram can also be used for determining the brightness statistic. With that variant, a false classification can be avoided when flickering is detected. In an alternative embodiment, an examination is first carried out to establish how many corresponding pixels of the first and second image range have a specifiable minimum difference in their respective brightness. If the number of pixels fulfilling that criterion exceed a further specifiable threshold, it will be detected that a new object has entered the second image range.

Figure 5:
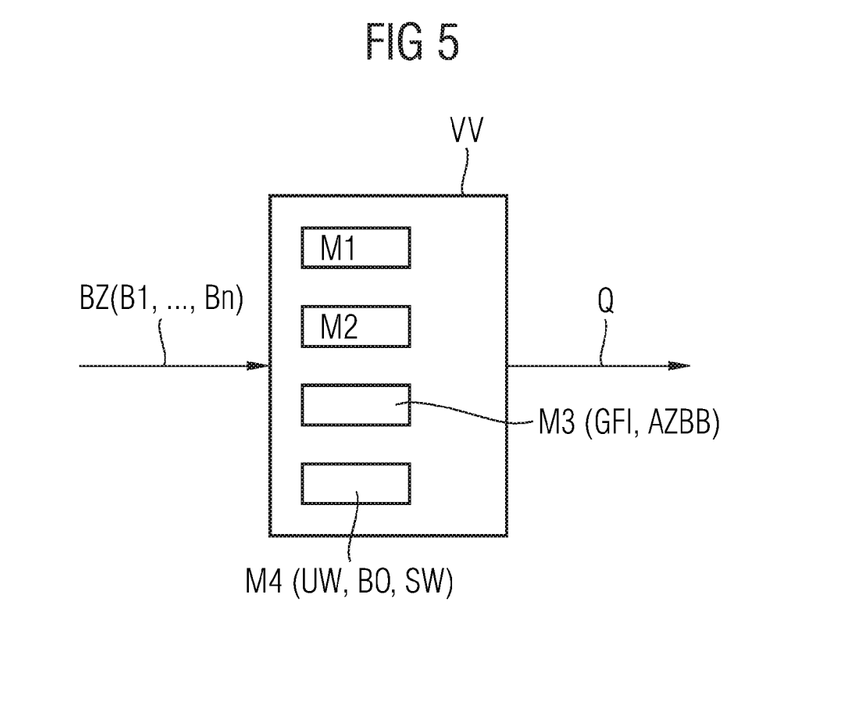
FIG. 5 shows a device for executing the method.
Figure 6:
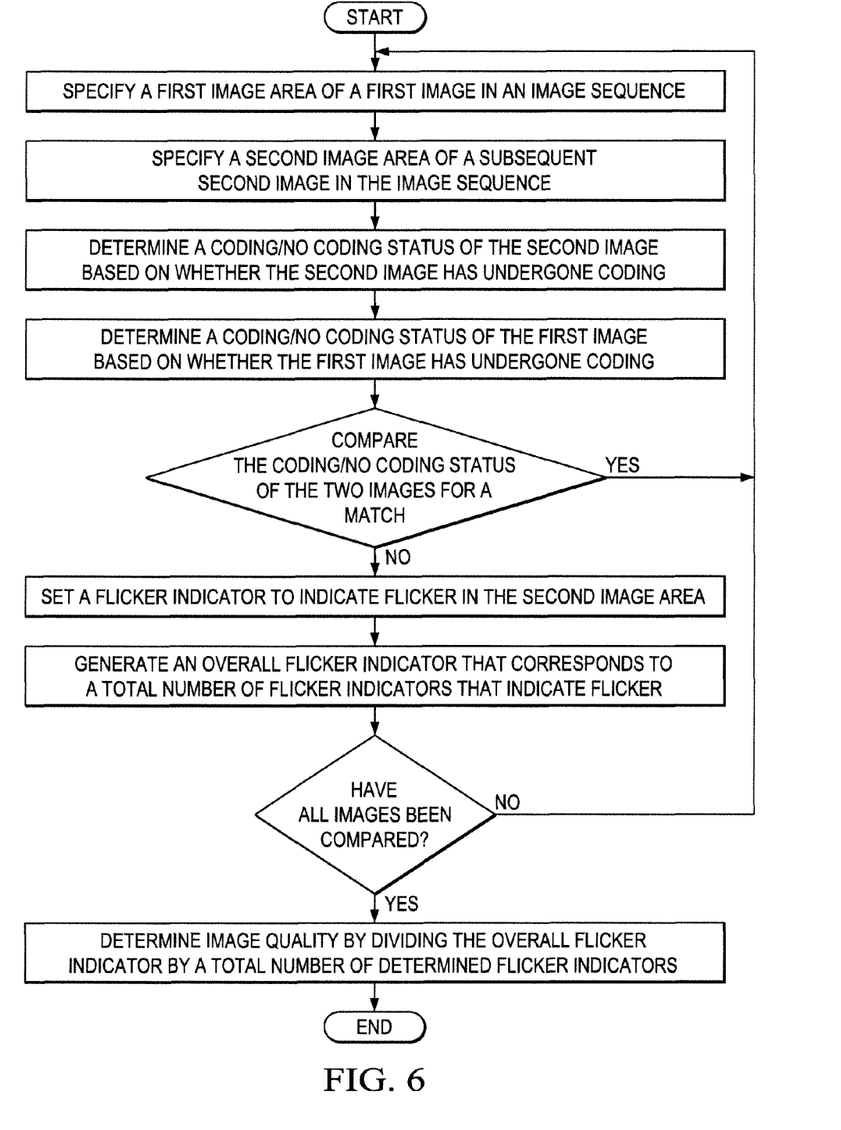
FIG. 6 is a flowchart depicting the steps of a method for determining an image quality of an image sequence comprising a plurality of images wherein images are used that are reconstructed from a data stream encoded by means of a predictive-encoding process, in accordance with an embodiment of the present disclosure.

In a device for determining an image quality of an image sequence comprising a plurality of images, the images being reconstructed from a data stream encoded by means of a predictive-encoding process, which device has the following means: A first means M1 for determining a respective flicker indicator I2, I3, I4 for an image range BB of the respective images B2, B3, B4 in the image sequence BZ, with the respective flicker indicator I2, I3, I4 indicating by means of two states Z1, Z2 whether flickering does or does not occur in the image range BB of the respective image B2;

A second means M2 for generating an overall flicker indicator GFI in such a way that the overall flicker indicator corresponds to the number of flicker indicators I2, I4 that indicate flicker;

A third means M3 for determining the image quality Q by dividing the overall flicker indicator GFI by a number of determined flicker indicators I2, I3, I4.

The device VV can furthermore have a fourth means M4 embodied such that the fourth means M4 executes developments of the method.

The means M1 to M4 can be implemented and operated in the form of software or hardware and/or a combination of software and hardware. Thus the method can have been stored in the form of a program code on a data carrier, with a computing unit reading the program codes from the data carrier and executing them. The computing unit is a commercially available computer, for example.

References:

[1] T. Orlowski, "Understanding QMM Objective Picture Quality Measurements", Application Note AN112, Pixelmetrix Corporation, http://www.broadcastpapers.com/whitepapers/PixelmetrixQMM.pdf

[2] P. Marziliano et al., "A No-Reference Perceptual Blur Metric", Proceedings of the International Conference on Image Processing, Vol. 3, pp. 57-60, Rochester, N.Y., Sep. 22-25, 2002

[3] A. Leontaris et al., "Flicker Suppression in JPEG2000 using Segmentation-based Adjustment of Block Truncation Lengths", Proc. IEEE International Conference on Acoustics, Speech, and Signal Processing, Honolulu, Hi., Apr. 15-20, 2007.

What is claimed is:

1. A method for determining an image quality of an image sequence comprising a plurality of images wherein images are used that are reconstructed from a data stream encoded by means of a predictive-encoding process, the method comprising the steps of:

for each image in the image sequence, determining a respective flicker indicator by:
specifying a first image area of a first image in the image sequence and a second image area of a subsequent second image in the image sequence, wherein the first and second image area occupy the same location within the respective first and second images,
determining a coding/no coding status of the second image area of the second image based on whether the second image area has (a) undergone no coding, wherein an image content of the second image area is generated by copying an image content of the first image area, or (a) undergone coding,
determining a coding/no coding status of the first image area of the first image based on whether the first image area has (a) undergone no coding, wherein an image content of the first image area is generated by copying an image content of a corresponding image area of a prior image, or (b) undergone coding,
comparing the coding/no coding status of the first and second image areas,
if the coding/no coding status of the second image area differs from the coding/no coding status of the first image area, setting a flicker indicator to indicate flicker in the second image area, thereby indicating a switch in the coding/no coding status from the first image area to the second image area,
generating an overall flicker indicator that corresponds to a total number of flicker indicators that indicate flicker; and
determining the image quality by dividing the overall flicker indicator by a total number of determined flicker indicators.

2. The method according to claim 1, wherein a difference value is produced between the first and second image area and flicker indicator of the second image area is set to indicate flicker if the difference value exceeds a specifiable threshold.

3. The method according to claim 2, wherein the specifiable threshold is selected as a function of an image property of the second image area.

4. The method according to claim 3, wherein the threshold will be raised if the image property of the second image area indicates at least one of a dark and/or highly structured image content.

5. The method according to claim 1, wherein an analysis is performed for the image area to determine whether an image content in the image area has been changed at least partially by a new image object, and the flicker indicator of the image area is not set to indicate flicker if the change to the image area due to a new image object is detected during the analysis.

6. The method according to claim 1, further comprising:
determining a respective flicker indicator for a number of image areas of the respective image;
generating the overall flicker indicator in such a way that the overall flicker indicator corresponds to the number of flicker indicators that indicate flicker; and determining the image quality by dividing the overall flicker indicator by a number of determined flicker indicators.

7. The method according to claim 1, wherein a difference value is produced between the first and second image area on the basis of luminance values of the pixels of the respective image areas, and the flicker indicator of the second image area is set to indicate flicker if the difference value exceeds a specifiable threshold.

8. A device for determining an image quality of an image sequence comprising a plurality of images, wherein the images are reconstructed from a data stream encoded by means of a predictive-encoding process, the device comprising logic instructions embodied in non-transitory computer-readable media and executable to:
for each image in the image sequence, determine a respective flicker indicator by:
specifying a first image area of a first image in the image sequence and a second image area of a subsequent second image in the image sequence, wherein the first and second image area occupy the same location within the respective first and second images,
determining a coding/no coding status of the second image area of the second image based on whether the second image area has (a) undergone no coding, wherein an image content of the second image area is generated by copying an image content of the first image area, or (b) undergone coding,
determining a coding/no coding status of the first image area of the first image based on whether the first image area has (a) undergone no coding, wherein an image content of the first image area is generated by copying an image content of a corresponding image area of a prior image, or (b) undergone coding,
comparing the coding/no coding status of the first and second image areas,
if the coding/no coding status of the second image area differs from the coding/no coding status of the first image area, setting a flicker indicator to indicate flicker in the second image area, thereby indicating a switch in the coding/no coding status from the first image area to the second image area,
generate an overall flicker indicator that corresponds to a total number of flicker indicators that indicate flicker; and
determine the image quality by dividing the overall flicker indicator by a number of determined flicker indicators.

9. The device according to claim 8, wherein the logic instructions are further operable to produce a difference value between the first and second image area and to set the flicker indicator of the second image area to indicate flicker if the difference value exceeds a specifiable threshold.

10. The device according to claim 9, wherein the logic instructions are further operable to select the specifiable threshold as a function of an image property of the second image area.

11. The device according to claim 10, wherein the logic instructions are further operable to raise the threshold if the image property of the second image area indicates at least one of a dark and/or highly structured image content.

12. The device according to claim 8, wherein the logic instructions are further operable to produce a difference value between the first and second image area on the basis of luminance values of the pixels of the respective image areas, and the flicker indicator of the second image area is not set to indicate flicker if the difference value exceeds a specifiable threshold.

13. The device according to claim 8, wherein the logic instructions are further operable to perform an analysis for the image area to determine whether an image content in the image area has been changed at least partially by a new image object, and the flicker indicator of the image area is not set to indicate flicker if the change to the image area due to a new image object is detected during the analysis.

* * * * *